United States Patent [19]
Ogawa

[11] Patent Number: 5,233,590
[45] Date of Patent: Aug. 3, 1993

[54] OPTICAL RECORDING/REPRODUCING APPARATUS INCLUDING MEANS FOR SYNCHRONIZING THE PHASE OF A DATA READ CLOCK SIGNAL WITH DATA RECORDED ON AN OPTICAL RECORDING MEDIUM

[75] Inventor: Hiroshi Ogawa, Tokyo, Japan

[73] Assignee: Sony Corporation, Tokyo, Japan

[21] Appl. No.: 908,817

[22] Filed: Jul. 2, 1992

Related U.S. Application Data

[63] Continuation of Ser. No. 710,382, Jun. 5, 1991, abandoned, which is a continuation of Ser. No. 283,475, Nov. 29, 1988, abandoned.

[30] Foreign Application Priority Data

Mar. 31, 1987 [JP] Japan ................................. 62-80319

[51] Int. Cl.5 .................................................. G11B 7/00
[52] U.S. Cl. .......................................... 369/48; 369/59
[58] Field of Search ................ 360/36.2, 37.1; 369/32, 369/50, 48, 59; 358/337, 339

[56] References Cited

U.S. PATENT DOCUMENTS

| | | | |
|---|---|---|---|
| 4,387,407 | 6/1983 | Wine .................... | 360/37.1 |
| 4,564,929 | 1/1986 | Yonezawa et al. ............ | 369/32 |
| 4,748,611 | 5/1988 | Tsuyoshi et al. ............ | 369/59 |
| 4,780,759 | 10/1988 | Matsushima et al. ............ | 358/325 |
| 5,012,460 | 4/1991 | Popovich et al. ............ | 369/32 |

FOREIGN PATENT DOCUMENTS

| | | |
|---|---|---|
| 0144813A1 | 6/1985 | European Pat. Off. . |
| 2517103 | 5/1983 | France . |
| 2581470 | 11/1986 | France . |

Primary Examiner—Donald E. McElheny, Jr.
Attorney, Agent, or Firm—Philip M. Shaw, Jr.

[57] ABSTRACT

The present invention relates to an optical recording/reproducing apparatus that can be suitably adapted to a magneto-optical disc apparatus which records data on, for example, a magneto-optical disc or reproduces data therefrom. An auxiliary synchronizing signal (3h) is recorded at a predetermined position on a recording medium, (1) on which a synchronizing signal (2a) is periodically prerecorded in advance, by the same recording means as the recording means for recording data between the synchronizing signals (2a) and (2a) and a phase of a data read clock signal of which the phase is locked by the synchronizing signal is controlled on the basis of the auxiliary synchronizing signal (3h). Thus, data can be properly read from the recording medium (1).

6 Claims, 4 Drawing Sheets

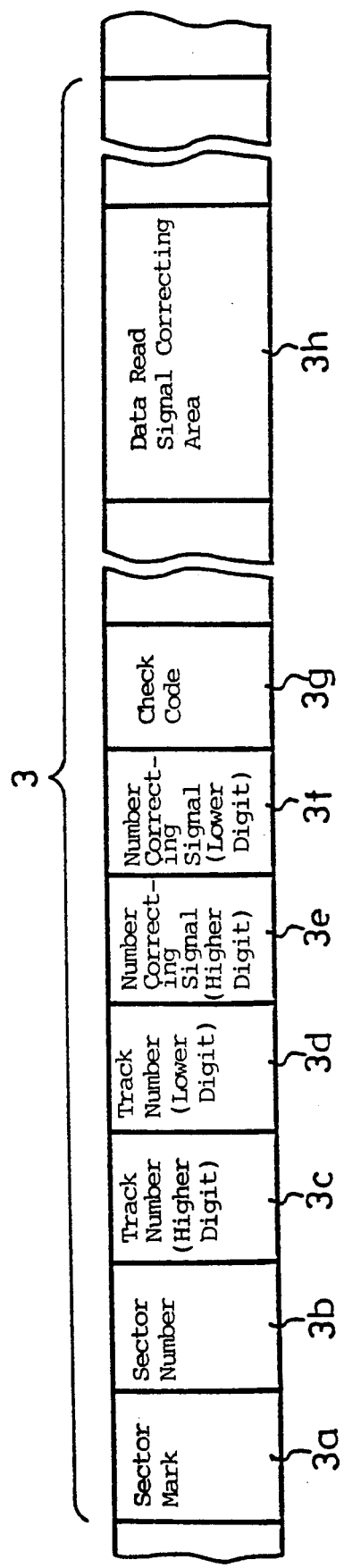
FIG. 2
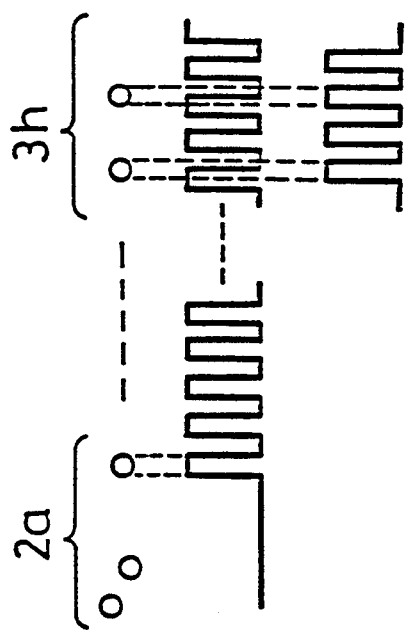
FIG. 3A
FIG. 3B
FIG. 3C

OPTICAL RECORDING/REPRODUCING APPARATUS INCLUDING MEANS FOR SYNCHRONIZING THE PHASE OF A DATA READ CLOCK SIGNAL WITH DATA RECORDED ON AN OPTICAL RECORDING MEDIUM

This is a continuation of co-pending application Ser. No. 07/710,382 filed on Jun. 5, 1991 now abandoned, which is a continuation of co-pending application Ser. No. 283,475 filed on Nov. 29, 1988 now abandoned.

TECHNICAL FIELD

The present invention relates to an optical recording apparatus that can be suitably adapted to a magneto-optical disc apparatus or the like which records data on, for example, a magneto-optical disc or reproduces data therefrom.

BACKGROUND ART

It is known to use magneto-optical discs as a recording medium of large capacity on which data is rewritable.

In a magneto-optical disc apparatus for recording data on the magneto-optical disc or reproducing data therefrom, a clock signal for reading data recorded on the disc is formed by sampling a high frequency signal derived from a photo-detector used to detect, for example, a servo pit formed on the magneto-optical disc by a sampling pulse.

In the above-mentioned magneto-optical disc apparatus, a timing (phase) at which the high frequency signal from the photo-detector is sampled is displaced due to movement of the elements, their temperature characteristic or the like. For example, a signal is recorded on the magneto-optical disc by a laser light. In this case, a signal recorded portion formed by the laser light is positionally displaced depending on the output state of the laser light. FIGS. 8A and 8B are diagrams illustrating different positions at which the signal recorded portions may be formed. In one case, a laser light of relatively low intensity is generated for a long time period in response to a pulse signal $L_1$ shown in FIG. 8A. In the other case, a laser light of relatively high intensity is generated for a short time period in response to a pulse signal $L_2$ shown in FIG. 8B. Although the laser laser outputs are substantially the same, recorded portions $P_1$ and $P_2$ formed by the respective laser lights are formed from the centers of the irradiated portions so that they are displaced from each other by $\delta$.

The displacement between the sampling timings directly leads to the displacement between a data read clock signal and recorded data. There is then a risk that an error will frequently occur in reading, for example, the recorded data. To solve this problem, in the prior art there is no other solution than adjusting at every circuit by using a delay line or the like. Thus, the adjusting operation requires much labor and time.

DISCLOSURE OF INVENTION

In view of the above-mentioned aspect, it is an object of the present invention to provide an optical recording/reproducing apparatus which can always produce a data read clock signal of an optimum timing.

In the optical recording/reproducing apparatus, an auxiliary synchronizing signal is recorded at a predetermined position of a recording medium on which a synchronizing signal is periodically recorded in advance by the same means as is used to record the data between the synchronizing signals, and the phase of data read clock signal of which the phase is locked by the synchronizing signal is controlled on the basis of the auxiliary synchronizing signal.

According to the optical recording/reproducing apparatus of the present invention, since the phase of the data read clock signal is adjusted on the basis of the auxiliary synchronizing signal recorded by the same means as is used to record the data, the data read clock signal is synchronized in phase with the recorded data, thus making it possible to satisfactorily read the data from the recording medium.

BRIEF DESCRIPTION OF DRAWINGS

FIG. 2 is a diagram of the format of an address area on a magneto-optical disk according to the present invention.

FIGS. 3A, 3B and 3C are an enlarged view of a servo area on a magneto-optical disk and clock diagrams according to the present invention.

BEST MODE FOR CARRYING OUT THE INVENTION

An embodiment of an optical recording/reproducing apparatus according to the present invention will hereinafter be described with reference to the attached drawings. In this embodiment, the present invention is applied to a magneto-optical disc apparatus. Accordingly, a format of a magneto-optical disc in this embodiment will be described first.

Figure 4:
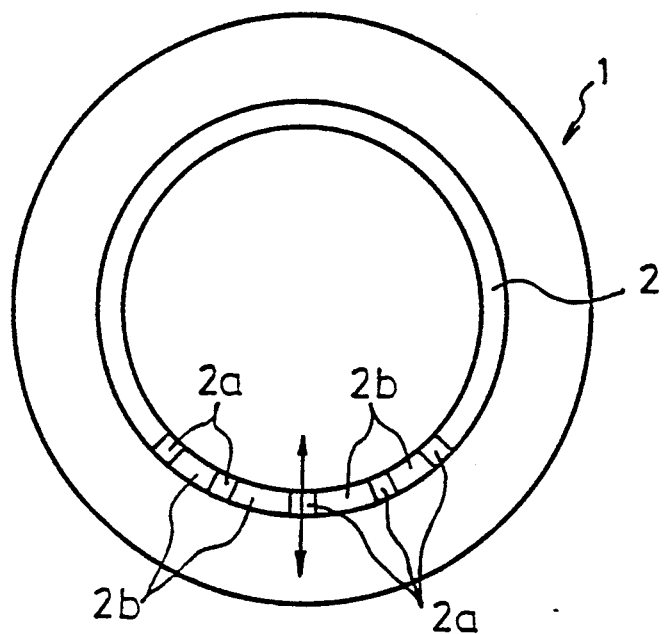
FIG. 4 is a plan view of a magneto-optical disk according to the present invention.

FIG. 4 is a plan view of a magneto-optical disc in this embodiment.

Referring to FIG. 4, a magneto-optical disc 1 is about, for example, 13 cm in diameter and has a storage capacity of more than 300M bytes on its single side. This disc 1 is rotated at a constant angular velocity and records data by, for example, concentrically forming tracks 2 where one is formed per revolution. The track number of tracks on the single side thereof amounts to, for example, 18,000 to 20,000 and each track is divided to provide, in this embodiment, 32 sectors.

Figure 5:
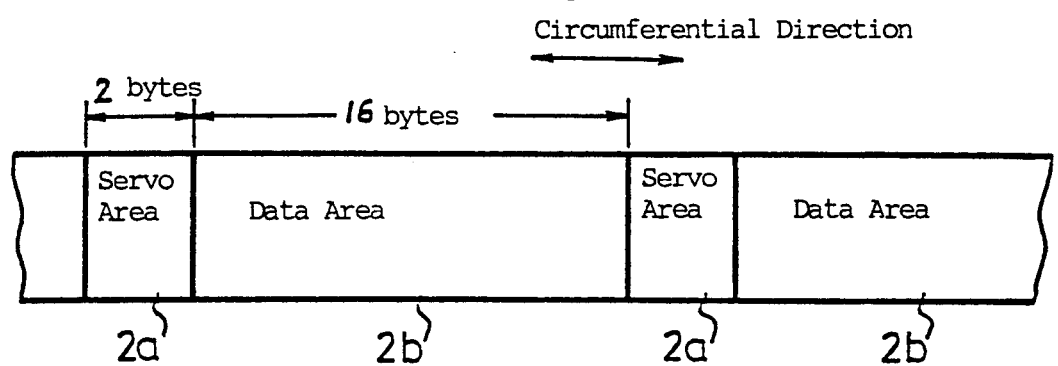
FIG. 5 is an enlarged view of one track of the magneto-optical disk of FIG. 4.

As shown in FIG. 5 in an enlarged-scale, each track is formed of a servo area 2a on which a servo pit (synchronizing signal) is formed in advance and a data area 2b on which data is to be written by a laser light. These servo areas and data areas are alternately formed along the circumferential direction of each track. Changing the lengths of the servo area 2a and the data area 2b into bytes, the servo area 2a, for example, is formed of 2 bytes and the data area 2b is formed of 16 bytes. In this embodiment, each of the sectors has 43 servo areas 2a and data areas 2b. Since a track has 32 sectors as mentioned above, each track includes a total of 1376 of the servo areas 2a and data areas 2b. As shown in FIG. 2, the data area 2b at the beginning of each sector is assigned as an address area 3. This address area 3 is such an area on which a sector number, a track number and so on are recorded in advance as data. In this embodiment, as shown in FIG. 2, there are recorded a sector mark 3a, a sector number 3b, a higher digit 3c of track number, a lower digit 3d of track number, a track number correcting signal (higher digit) 3e, a track number correcting signal (lower digit ) 3f and a check code 3g in this order.

The recorded portion of the check code 3g is followed by a data read signal correcting area 3h which is distant from the check code 3g by one byte and on which an auxiliary synchronizing signal is recorded. The recording is carried out for the correcting area 3h when data is recorded on the data area 2b of the sector corresponding to this address area as will be described later.

Figure 6:
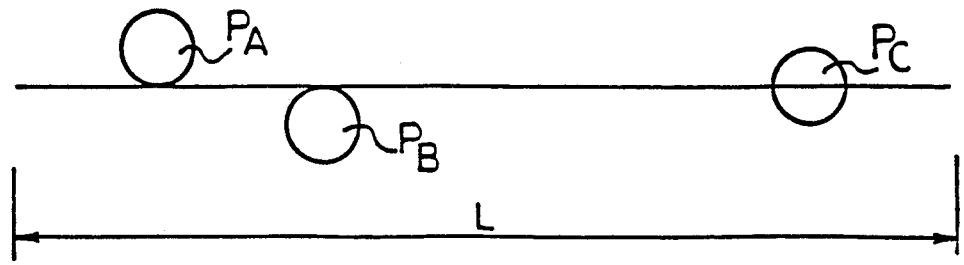
FIG. 6 is a digram showing the possible location of pits in a servo area shown in FIG. 5.

FIG. 6 illustrates each servo area 2a in detail in which three pits $P_A$, $P_B$ and $P_C$ are formed, respectively. The pits $P_A$ and $P_B$ are vertically displaced from each other across the central line of the track formed on the above-mentioned disc 1. The pit $P_C$ is formed on the central line of the track. The diameter of each of the pits $P_A$, $P_B$ and $P_C$ is in a range of about 0.5 to 1.0 μm and a practical length L of the servo area is in a range of about 15 to 30 μm in practice.

Figure 7:
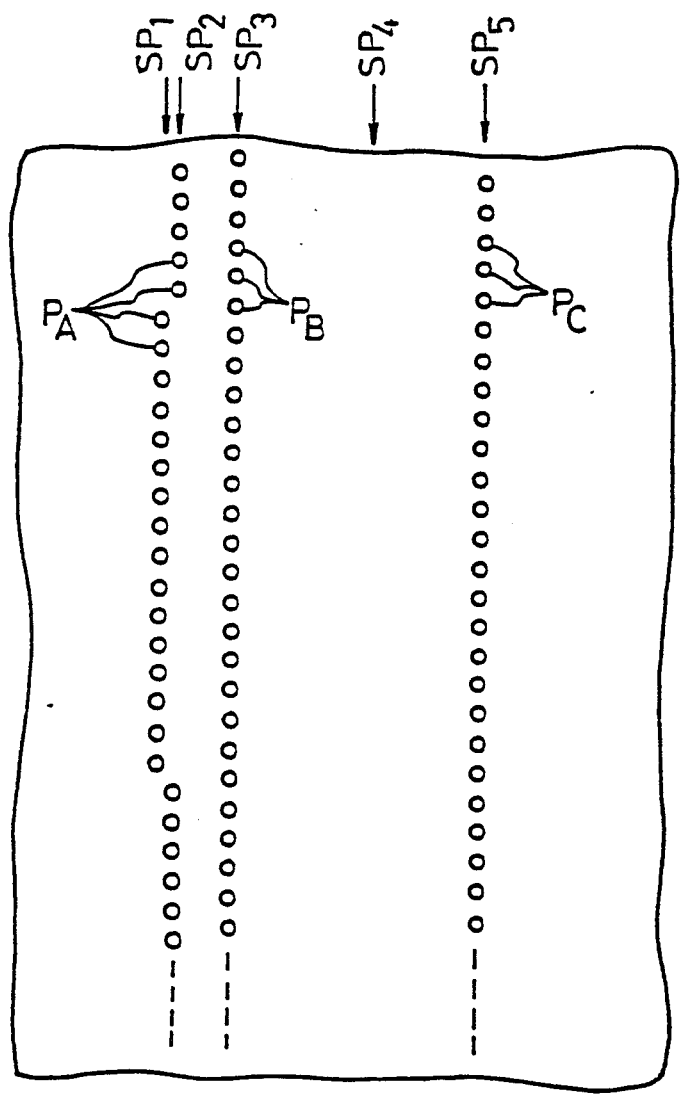
FIG. 7 is an enlarged view of a portion of the magneto-optical disk of FIG. 4.
Figure 8A:
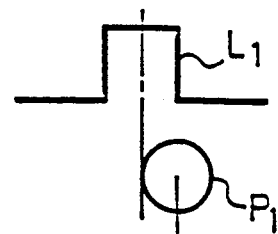
FIGS. 8A and 8B are diagram showing how pits may be formed on a magneto-optical disk.
Figure 8B:
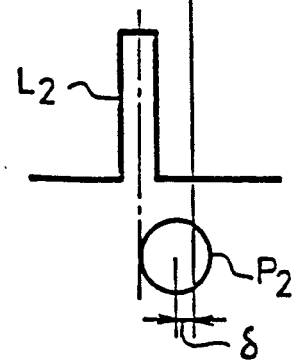

FIG. 7 shows a condition in which the pits $P_A$, $P_B$ and $P_C$ on different tracks are respectively aligned in the radial direction of the disc 1 (in the direction shown by arrows in FIG. 4). The pits $P_B$ and $P_C$ are each aligned on a single radius of the disk, while the pits $P_A$ are aligned in such a manner that they are shifted back and forth in the longitudinal direction of the track every 16 pits. The alignment in which the pits $P_A$ are displaced at every 16 pits is used to carry out a counting operation for searching the track number of the track as it is scanned by an optical pickup. The pit $P_A$ is sampled by a sampling pulse $SP_1$ or a sampling pulse $SP_2$, the respective pits $P_B$ and $P_C$ are sampled by sampling pulses $SP_3$ and $SP_5$ and the mirror surface region between the pits $P_B$ and $P_C$ is sampled by a sampling pulse $SP_4$ and the pits are thereby used to carry out various kinds of servo operations and to produce clocks which will be described later.

The recorded pattern on the magneto-optical disc in this embodiment is formed as described above, and data is recorded on this magneto-optical disc as follows.

Upon recording data by means of a known optical recorder/reproducer device 10 (FIG. 1), data is separated at every sector and recorded in the data area 2b of each of the above-mentioned tracks 2. At that time, clock signals are formed in a clock generator 21 (FIG. 1) on the basis of sampling the pits $P_A$, $P_B$ and $P_C$ of the servo area 2a. In synchronism with the clock signal, a laser light is irradiated on the data area 2b to record data on the data area 2b. When the data is recorded on the data area 2b, a signal of a predetermined pattern containing an independent recording pattern is recorded as an auxiliary synchronization signal in the data read signal correcting area 3h of the address area 3 of the sector to which the recorded data area 2b belongs. The auxiliary synchronization signal is recorded on the data read signal correcting area 3h by the irradiation of a laser light in synchronism with the same clock signal (from the clock generator 21) which results from sampling the above-mentioned servo area 2a. The irradiation conditions such as the output of the laser light and so on are also selected to be the same as those under which the data is recorded on the data area 2b.

The arrangement and the operation of the reproducing apparatus which reads the recorded data from the thus recorded magneto-optical disc will be described next.

Figure 1:
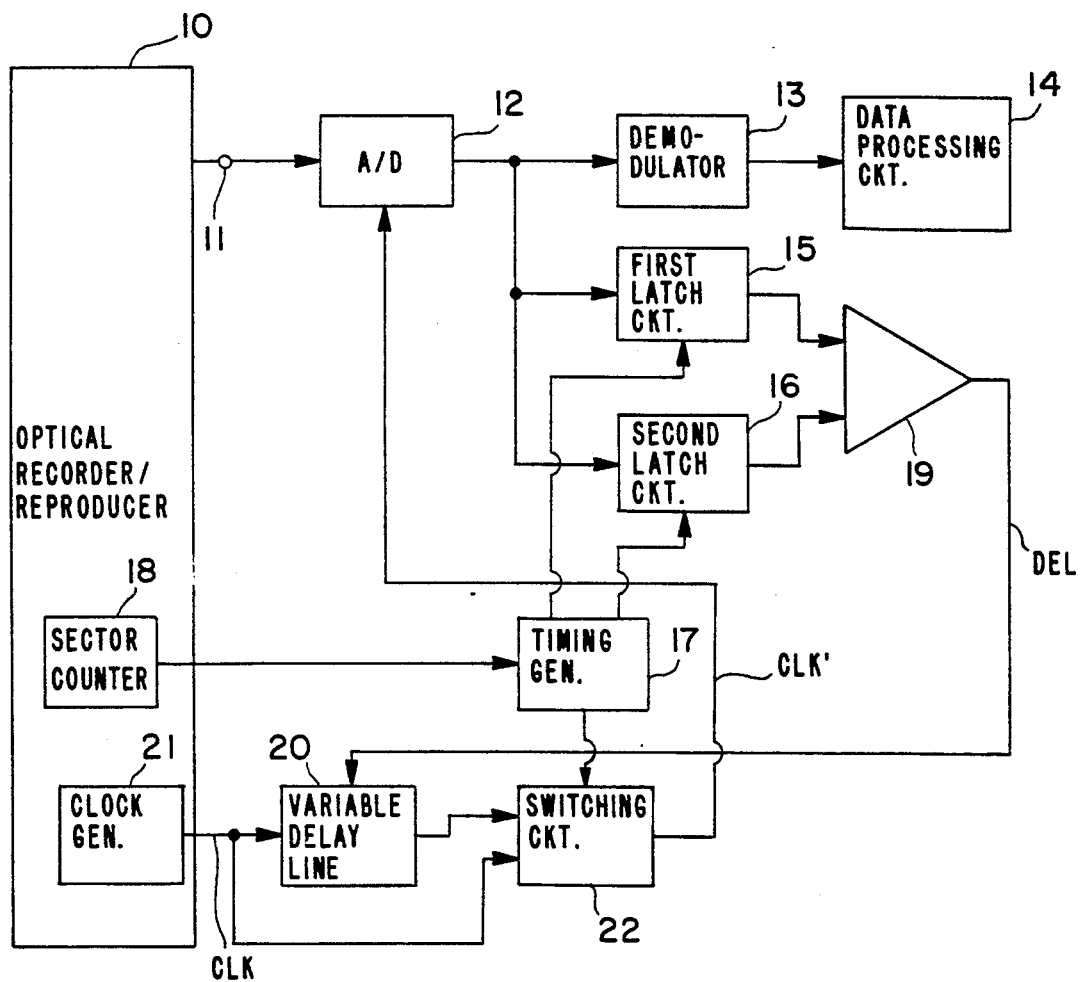
FIG. 1 is a block diagram showing an embodiment of a main portion of an optical recording/reproducing apparatus according to the present invention.

FIG. 1 is a diagram showing an arrangement of the reproducing apparatus of this embodiment. In the figure, reference numeral 11 designates a reproduced high frequency signal input terminal to which is supplied a high frequency signal which results from reproducing the above-mentioned magneto-optical disc 1 by means of the known optical recorded/reproducer device 10. The optical recorder/reproducer 10 is to be understood as including a sector counter 18 and a clock generator 21, whose operations will be explained in greater detail later. The reproduced high frequency signal applied to the input terminal 11 is supplied to an analog/digital converter (hereinafter, referred to as an A/D-converter) 12. The A/D-converter 12 is adapted to convert into a digital signal (pulse signal) the high frequency signal supplied thereto in synchronism with a data read clock signal which will be described later. The pulse signal from the A/D-converter 12 is supplied to a demodulator 13 which carries out a predetermined demodulation. The demodulated signal therefrom is supplied to a data processing circuit 14 and the data processing circuit 14 processes the reproduced data.

The pulse signal from the A/D-converter 12 is also supplied to first and second latch circuits 15 and 16. The latch circuits 15 and 16 are adapted to latch the pulse signal from the A/D-converter 12 at timings that are determined by latch signals derived from a timing generator 17. The thus latched pulse signals are supplied to an operational amplifier 19.

The timing generator 17 is supplied with a read portion detected signal that is detected by the sector counter 18 and the timing generator determines the output timings of the latch signals on the basis of the detected signal. The latch signal supplied to the first latch circuit 15 is used for timing when the pit forming portion signal of the servo area 2a is latched, while the latch signal supplied to the second latch circuit 16 is used for timing when the auxiliary synchronization signal recorded portion of the data read signal correcting area 3h of the address area 3 is latched. The latched pulse signals derived from the first and second latch circuits 15 and 16 to which the latch signal is supplied as described above are supplied to a non-inverting input terminal respectively, and an inverting input terminal of the operational amplifier 19 which forms a comparator. This operational amplifier 19 measures the level difference between the signals supplied to both of the terminals thereof and supplies an output signal corresponding to the measured level difference to a delay time selecting signal input terminal of a variable delay line 20. The variable delay line 20 is adapted to delay the clock signal CLK derived from a clock signal generator 21 by a predetermined delay time and supply the thus delayed clock signal to a switching circuit 22. The clock signal generator 21 produces a clock signal CLK on the basis of sampling the servo area line 20 to the switching circuit 22 and is also directly supplied to the switching circuit 22 without being delayed. The switching circuit 22 switches between the thus delayed clock signal and the clock signal, which is not delayed, on the basis of a switching signal derived from the timing generator 17. The clock signal CLK' from the switching circuit 22 is supplied to the A/D converter 12 as the above-mentioned conversion clock signal. The switching signal from the timing generator 17 responds to the read portion detected signal detected by the sector counter 18 and causes the switching circuit to deliver the non-delayed clock signal when the read portion is the servo area 2a, and to deliver the clock signal delayed by the delay line 20 when the read portion is the data area 2b.

With the above-mentioned arrangement, the clock signal CLK' supplied to the A/D converter 12 thus is the non-delayed clock signal that is generated by the clock generator 21 when the read portion is the servo area 2a, and is the clock signal delayed by the variable delay line 20 when the read portion is the data area 2b. The delay time of the delay line 20 is determined by the level difference signal produced by the operational amplifier 19. The signals compared by the operational amplifier 19, in response to the latch operations of the latch circuits 15 and 16, are the signal level when the pits on the digitized servo area 2a are reproduced in synchronism with the clock signal from the clock generator 21 and the signal level when the recorded auxiliary synchronization signal on the data read signal correcting area 3h digitized in synchronism with the clock signal delayed by the variable delay line 20 is reproduced. Thus, when the operational amplifier 19 detects that both of the signal levels are equal, the data (digitized signal) of both the areas 2a and 3h are read properly and the delay time of the variable delay line 20 is thus an optimum one. If there is a difference between the levels, the signal level when the recorded auxiliary synchronization signal in the data read correcting signal area 3h is reproduced is too low so that the delay time of the variable delay line 20 is changed by the supply of the level difference signal thereto so as to become equal to the signal level when the pits of the servo area 2a are reproduced. The delay time of the variable delay line 20 is adjusted once per, for example, one sector.

According to this reproducing apparatus, since the delay time of the delay line 20 is changed as described above, the recorded data in the data area 2b can be reproduced satisfactorily. In other words, the clock generator 21 generates a clock signal shown in FIG. 3B on the basis of the servo area 2a shown in FIG. 3A. Since this clock signal is directly used to read the signal in the servo area 2a owing to the above-mentioned operation, the phase thereof is always coincident with the phase of the signal that is used to read the pit of the servo area 2a.

On the other hand, the signal is recorded in the data read signal correcting area 3h at the same time as that of the data recording in the data area 2b by a data recording apparatus different from the apparatus which forms the pits on this servo area 2a so that the phase of the auxiliary synchronization signal in the data read signal correcting area 3h is displaced as shown in FIG. 3A. With such a displacement, the signal cannot be read out satisfactorily by the clock signal shown in FIG. 3B. However, the delay time of the variable delay line 20 can be corrected by the level difference detection in the above-mentioned operational amplifier 19 so that as shown in FIG. 3C, the phase of the clock signal is adjusted so as to read the recorded auxiliary synchronization signal of the data read signal correcting area 3h satisfactorily. Since the data recorded in the data area 2b following the data read signal correcting area 3h within the same sector is recorded under the same conditions by the same recording apparatus as that used to record the auxiliary synchronization signal in the data read signal correcting area 3h, the signal can be read out under the optimum condition by the clock signal of which the phase is adjusted.

According to the optical recording/reproducing apparatus of this embodiment as described above, since the phase difference caused by the different recording conditions such as the recording apparatus, the recording medium or the like can be automatically adjusted by the auxiliary synchronization signal that is recorded in the data read signal correcting area 3h as the sampling signal upon recording, the data can always be read under optimum conditions.

The present invention is not limited to the above-mentioned embodiment but can take various modifications without departing from the scope of the invention as set forth in the following claims.

I claim:

1. An optical recording/reproducing apparatus for recording data on a recording medium and reproducing the data, wherein the recording medium includes a previously recorded synchronizing signal at regular intervals, comprising:
   recording/reproducing means for recording data between the synchronizing signals, and recording an auxiliary synchronizing signal at a predetermined position relative to the synchronizing signals on the recording medium and for reproducing the data, the synchronizing signal and the auxiliary synchronizing signal recorded on the recording medium, the recording/reproducing means further including data read clock means which is responsive to the reproduced synchronizing signals for generating a data read clock signal having a phase which is determined by the reproduced synchronizing signals;
   means for altering the phase of the data read clock signal based upon the reproduced auxiliary synchronizing signal; and
   analog to digital converting means connected to the recording/reproducing means and supplied with the data read clock signal for converting the reproduced data from the recording medium into digital data in synchronism with the data read clock signal.

2. An optical recording/reproducing apparatus according to claim 1 wherein the means for altering the phase of the data read clock signal further comprises:
   comparative means for detecting the difference in the levels of the reproduced synchronizing signals and the auxiliary synchronizing signals and producing a delay control signal; and
   variable delay line means responsive to the delay control signal and supplied with the data read clock signal for delaying the data read clock signal by a delay time representative of the difference in the levels of the reproduced synchronizing signal and the auxiliary synchronizing signal.

3. An optical recording/reproducing apparatus according to claim 1, wherein the recording medium has servo areas and data areas between the servo areas, and the synchronizing signal is recorded in a servo area, and wherein the recording/reproducing means records the auxiliary synchronizing signal in a data area between the servo areas.

4. A method of recording data on a recording medium and reproducing the data, wherein the recording medium includes a previously recorded synchronizing signal at regular intervals, comprising the steps of:
- recording data between the synchronizing signals and an auxiliary synchronizing signal at a predetermined position on the recording medium relative to the synchronizing signals;
- reading the synchronizing signals and the auxiliary synchronizing signals;
- generating a data read clock signal having a phase which is determined by the reproduced synchronizing signal;
- altering the phase of the data read clock signal based upon the reproduced auxiliary synchronizing signal; and
- reproducing data and digitizing the reproduced data in synchronism with the data read clock signal.

5. A method of reproducing data according to claim 4 further comprising producing a variable delay time based upon the difference in the levels of the reproduced synchronizing signal and the auxiliary synchronizing signal and the step of altering the phase of the data read clock signal further comprises altering the phase of the data read clock signal based upon the variable delay time.

6. A method of reproducing data according to claim 4 wherein the recording medium has servo areas and data areas between the servo areas, and the synchronizing signal is recorded in a servo area, and wherein the step of recording the auxiliary synchronizing signal further comprises recording the auxiliary synchronizing signal in a data area between the servo areas.

* * * * *